(12) United States Patent  (10) Patent No.: US 8,938,361 B2
Williams et al.  (45) Date of Patent: Jan. 20, 2015

(54) ELECTRONIC GARDENING TOOL AND METHOD OF CONFIGURING THE SAME

(75) Inventors: Mark B. Williams, Moss Beach, CA (US); Larry L. Holbein, Woodstock, IL (US)

(73) Assignee: Luster Leaf Products, Inc., Woodstock, IL (US)

( * ) Notice: Subject to any disclaimer, the term of this patent is extended or adjusted under 35 U.S.C. 154(b) by 1079 days.

(21) Appl. No.: 12/962,274

(22) Filed: Dec. 7, 2010

(65) Prior Publication Data

US 2011/0137563 A1  Jun. 9, 2011

Related U.S. Application Data

(60) Provisional application No. 61/267,206, filed on Dec. 7, 2009.

(51) Int. Cl.
*G01V 3/00* (2006.01)
*G01D 18/00* (2006.01)

(52) U.S. Cl.
CPC .................................. *G01D 18/002* (2013.01)
USPC ............................................................ 702/2

(58) Field of Classification Search
USPC ................................................ 702/2, 85, 182
See application file for complete search history.

(56) References Cited

U.S. PATENT DOCUMENTS 5,621,669 A * 4/1997 Bjornsson ........................ 702/85
7,571,075 B2 * 8/2009 Glenn et al. ..................... 702/182

* cited by examiner

*Primary Examiner* — Aditya Bhat
(74) *Attorney, Agent, or Firm* — David I. Roche; Baker & McKenzie LLP

(57) ABSTRACT

The tools and methods disclosed herein can convert an analog signal from the soil sensor probes into a digital format that can be read by a low cost digital microcontroller which acts on the digital data with formulae and tables so that the displayed information is the same or nearly the same as the readings in the same soil from the analog meters. To provide accurate readings, the described tools can apply either of a fixed or floating calibration method to set a reference of the measured soil pH and moisture measure. The floating calibration method also permits adjustment of the measure reference to correct calibration imprecision induced by fluctuation in the battery voltage.

21 Claims, 11 Drawing Sheets

ELECTRONIC GARDENING TOOL AND METHOD OF CONFIGURING THE SAME

CROSS-REFERENCE TO RELATED APPLICATIONS

This is a Regular Application which claims priority to U.S. Provisional Patent Application No. 61/267,206, which was filed on Dec. 7, 2009, and which is incorporated herein by reference.

BACKGROUND

1. Field of the Invention

The present invention generally relates to electronic gardening tools, and more particularly to an electronic gardening tool that can measure soil pH and moisture, and a method of configuring the same.

2. Description of the Related Art

Moisture and pH meters on the consumer market use analog or digital meters to display the pH and moisture of soil. The analog meters may require expensive manual calibration that has to be done at the factory. On the other hand, the digital meters require extra calibration circuitry that also need manual calibration. before taking the measure in the soil.

Therefore, there is presently a need for an improved gardening tool that can be manufactured in a cost-effective manner and address the foregoing issues.

SUMMARY

The present application describes an electronic gardening tool and a method of configuring the same.

In some embodiments, the tool can comprise a sensor circuit adapted to output an analog signal reflecting a measure of the soil characteristic, an analog-to-digital converter adapted to convert the analog signal to a digital value, a microcontroller receiving and processing the digital value, and a display panel for displaying the measure of the soil characteristic. The microcontroller is configured to obtain a plurality of initial readings from the sensor circuit when the apparatus is powered on, and assign a zero reference associated with a neutral value of the soil characteristic to a nominal value derived by averaging the initial readings.

The present application also describes a method of configuring a configuring an electronic gardening tool. The method can comprise obtaining a plurality of initial analog readings from the sensor circuit as the electronic gardening tool is powered on, averaging the initial analog readings to obtain a nominal value, and assigning a zero reference associated with a neutral reference value of the soil characteristic to the nominal value.

In some variant embodiment, the electronic gardening tool can comprise a sensor circuit adapted to output an analog signal reflecting a measure of the soil characteristic, a microcontroller coupled with the sensor circuit, wherein the microcontroller includes an analog-to-digital converter adapted to convert the analog signal to a digital value, a display panel for displaying the measure of the soil characteristic, and a calibration circuit adapted to set a zero reference associated with a neutral value of the soil characteristic to a fixed reference voltage from the sensor circuit.

The inventions shown and described herein have the advantage of fewer parts than other devices that measure soil characteristics, and this reduction in parts improves the reliability of devices made in accordance herewith. In addition, devices made in accordance with the features and structures disclosed herein maintain their calibration over the life of the product without user action, even after many years of use in a difficult environment (outdoors), where conditions may include hot and cold temperatures, direct sun, variations in humidity and generally damp conditions. Devices made in accordance herewith maintain their calibration even if they are dropped or shaken, which might otherwise cause a device with a mechanical calibration, such as a variable resistor, to move in a way that would adversely affect the calibration and reliability of the device.

DETAILED DESCRIPTION

The tools and methods disclosed herein can convert an analog signal from the soil probes used by the analog meters into a digital format that can be read by a low cost digital microcontroller which acts on the digital data with formulae and tables so that the displayed information is the same or nearly the same as the readings in the same soil from the analog meters. The low cost design takes advantage of the fact that for most users, an exact scientific number is not needed; rather, most users need a reliable indication of the moisture level and of the pH level. For the consumer, the soil is such that moving the probe up or down or left or right will cause the reading to change by 5% to 10% or more, but the information supplied—even with these higher level of tolerances—is valuable, that is, the ground is either too wet or too dry, and by about how much.

Figure 1:
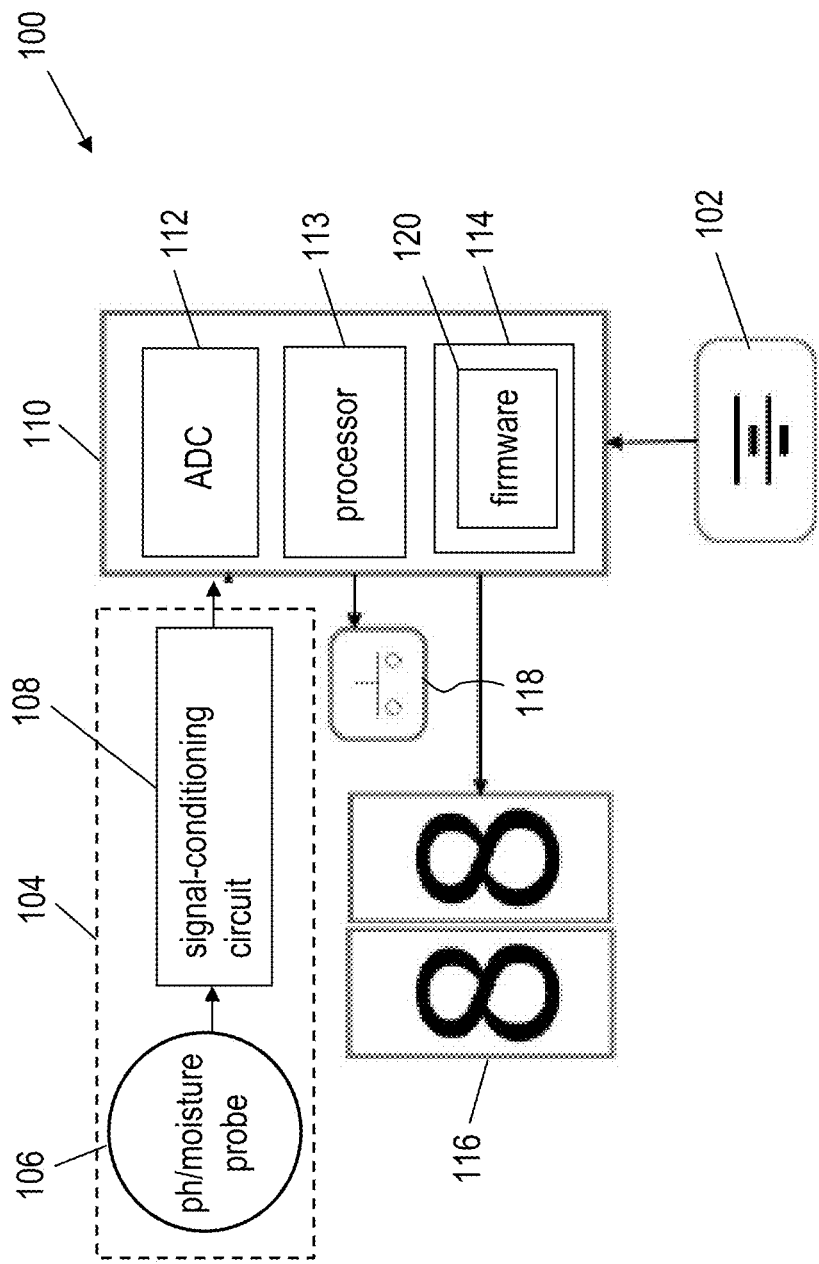
FIG. 1 is a block diagram illustrating one embodiment of an electronic gardening tool.

FIG. 1 is a simplified block diagram illustrating an electronic gardening tool 100. The electronic gardening tool 100 can include a battery power circuit 102, a sensor circuit 104 having a sensor device 106 and a signal conditioning circuit 108, a microcontroller 110 incorporating an analog-to-digital converter (ADC) 112, a processor 113 and a memory 114, a display panel 116 coupled with the microcontroller 110, and one or more push button switch 118.

The battery power circuit 102 can be coupled with the microcontroller 110, and provide electric power necessary for operation of the different components in the electronic gardening tool 100. Power outputted from the battery power circuit 102 may be in the form of a DC electric signal supplied to the microcontroller 110.

The sensor device 106 can output an analog reading reflecting a detected soil characteristic. Examples of the sensor device 106 can include a pH sensor (in which case the gardening tool 100 can be configured as a pH meter) and a moisture sensor (in which case the gardening tool 100 can be configured as a moisture meter). These instances of the sensor device 106 can typically have a measuring probe that is comprised of multiple electrodes capable of generating a varying electric signal in accordance with the level of pH/moisture sensed at the sensor probe.

The signal conditioning circuit 108 can convert the analog reading from the sensor device 106 into an analog signal that can be processed by the microcontroller 110. In particular, the signal conditioning circuit 108 can include electronic components such as resistor elements, capacitors, and the like adapted to convert the output from the sensor device 106 to suitable levels for processing through the microcontroller 110.

The microcontroller 110 can receive an analog signal reflecting readings of the soil characteristic measured by the sensor circuit 104, convert the analog signal into digital data via the ADC 112, and compute the digital data to derive a measurement value of the soil characteristic via the processor 113. In one embodiment where the sensor device 106 is a pH sensor, the pH probe output has a current that moves in one direction when acidic and in the opposite direction when basic. Standard methods of dealing with this require multiple voltages and expensive parts. In order to utilize a low cost analog-to-digital converter, a "virtual ground" of about 2 volts above the battery ground may be provided, so that a voltage reading made above and below the 2-volts virtual ground, rather than above and below battery ground.

For driving the microcontroller 110, an embedded firmware 120 loaded in the memory 114 can include one or multiple program codes that are respectively configured to compute each soil characteristic of interest (e.g., pH and moisture characteristics in the illustrated embodiment) in accordance with the readings provided by the sensor circuit 104. For example, in case the sensor device 106 is a moisture sensor, the embedded firmware 120 can include a first program code adapted to drive the microcontroller 110 to compute moisture measurement. If the sensor device 106 is a pH sensor, a second program code can be provided to drive the microcontroller 110 to compute pH measurement.

In one preferable embodiment, the same firmware 120 incorporating the aforementioned different program codes may be loaded in the microcontroller 110 regardless of the type of the sensor device 106 assembled in the electronic gardening tool 100. The microcontroller 110 can automatically determine the correct program code to run by detecting the output level from the sensor device 106, which may fall in different ranges depending on the type of the sensor device 106. For example, the output signal from a moisture sensor generally fluctuates around zero volt, whereas the output signal from a pH sensor may fluctuate around a distinct voltage above zero (e.g., 2 volts). In one embodiment, the output data of the ADC 112 reflecting these differences in the sensor output voltage can be read by the processor 113 to determine the type of sensor device 106 (e.g., moisture or pH sensor), such that the correct program code can be selected for processing the soil characteristic of interest. In this manner, the same microcontroller 110 can assembled in the electronic gardening tool 100 even if different types of the sensor device 106 is assembled. This reduces the extra cost for keeping separate inventories of the microcontroller 110, while retaining the ability to easily switch the production line to different meter type.

While the aforementioned design permits automatic configuration of the proper program for computing either of the pH or moisture measurement, alternate embodiments may also provide a key that can be manually operated to select the program code to run.

Referring again to FIG. 1, the value of the soil characteristic computed by the microcontroller 110 can be displayed via the display panel 116. In one simplified embodiment, the display panel 116 can exemplary include a 2-digit liquid crystal display with a decimal point that can display the measured soil characteristic.

The button cell 116 can include a plurality of buttons (e.g., power button, select button, etc.) that can be depressed for controlling the operation of the electronic gardening tool 100.

The electronic gardening tool may adopt either of a fixed calibration method or a floating calibration method. In the fixed calibration method, a reference of the measured soil characteristic may be associated with a sensor reference voltage that is fixed by the manufacturer and remain unchanged during use. As a result, the soil characteristic can be measured as absolute readings taken relative to the fixed reference voltage. In contrast, with the floating calibration method, the tool can detect the actual sensor reference voltage in a real use situation, and automatically associate the reference of the measured soil characteristic therewith. Accordingly, the soil characteristic can be measured as a relative difference between each reading and the actual reference voltage, which may vary according to the actual use condition.

Figure 2:
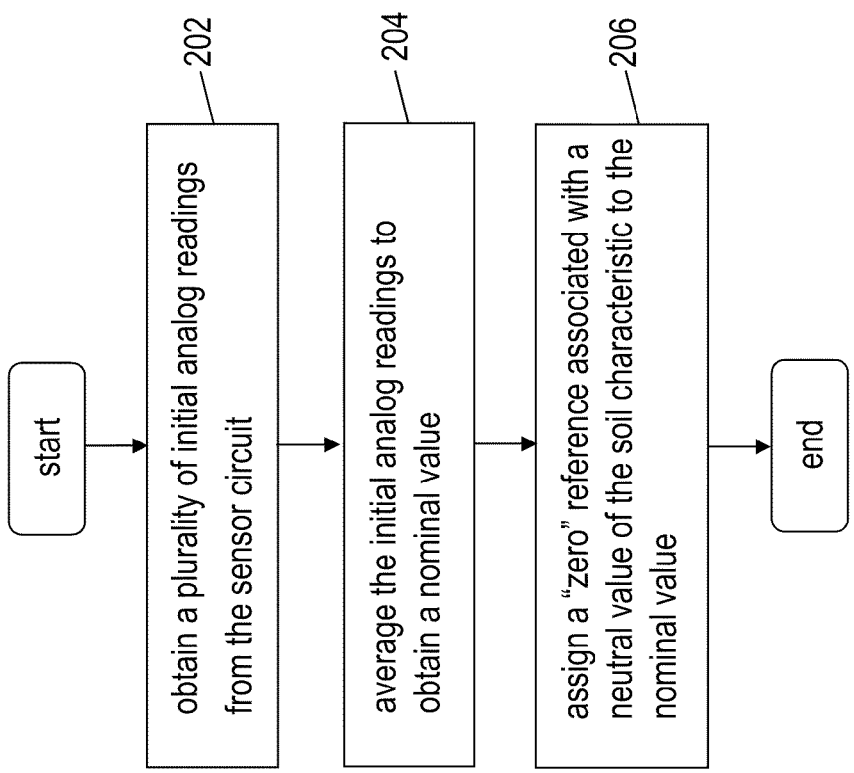
FIG. 2 is a flowchart illustrating processing steps performed by the microcontroller shown in FIG. 1 according to a floating calibration method.

In conjunction with FIG. 1, FIG. 2 is a flowchart illustrating processing steps performed by the microcontroller 110 according to a floating calibration method. When the electronic gardening tool 100 is switched on, the microcontroller 110 can perform step 202, whereby the microcontroller 110 can obtain a plurality of initial analog readings from the sensor circuit 104. These initial analog readings can typically represent analog signal outputs from the sensor device 106 representing the measured soil characteristic. In step 204, the microcontroller 110 can average these initial analog readings to derive a nominal value. In step 206, the microcontroller 110 can then assign a "zero" reference associated with a neutral value of the soil characteristic to the nominal value. Given that the electronic gardening tool 100 is generally switched on only while it is held in a user's hand, it can be assumed that the initial analog readings are obtained in the air (i.e., not in the ground). In case the sensor device 106 is a pH sensor, the "zero" reference assigned to the nominal value can be accordingly associated with the neutral pH value of 7.0 (i.e., assumed pH in the air). In case the sensor device 106 is a moisture sensor, the "zero" reference assigned to the nominal value can be associated with the moisture reference value of 0 (i.e., assumed moisture reference in the air).

After the zero reference is calibrated, the electronic gardening tool 100 can be placed into the ground to measure the soil characteristic of interest. In one embodiment, the electronic gardening tool 100 may be provided with a function that can hold the display of the last data. For example, the display panel 116 can retain the measured value for 10 seconds after the tool 100 is removed from the soil. The microcontroller 110 can recognize a sudden change in the value towards the neutral value and retain the value before the sudden change was made, and continue to display that value. The microcontroller 110 can be programmed to differentiate from a situation where the tool 100 is moved around in the soil, and normal fluctuations in the reading (even when the probe is not moved) that do not trigger the "hold" feature and permits displaying of the current reading. For illustration, this function can work as follows: place the probe into a planter, and the reading is shown, but difficult to read perhaps because of the location of the planter. The user can lift up the tool 100 for better viewing and observe the value from the time when it was in the soil. The microcontroller 110 can be also programmed to determine when the probe is re-inserted in the soil, by sensing a sudden change away from the neutral value, and causes the displayed value to be replaced by the current value from the probe. The hold value remains on the screen until either it senses being placed back into soil or for up to ten seconds, whichever happens first. After ten seconds, if the tool 100 senses that it is still not placed in the soil, the display panel 116 returns to the neutral value.

As the electronic gardening tool 100 is being used over a period of time, the battery may age, resulting in a decrease of the battery voltage. This fluctuation of the battery voltage may alter the accuracy of the floating calibration, and cause an inner clock signal of the microcontroller 110 to slow down, which may result in less accurate measurement. Conversely, a battery's voltage may increase, for example from an increase in temperature. In one embodiment, the microcontroller 110 can also be configured to detect and measure these small, but potentially significant, fluctuations in voltage and perform appropriate correction.

Figure 3:
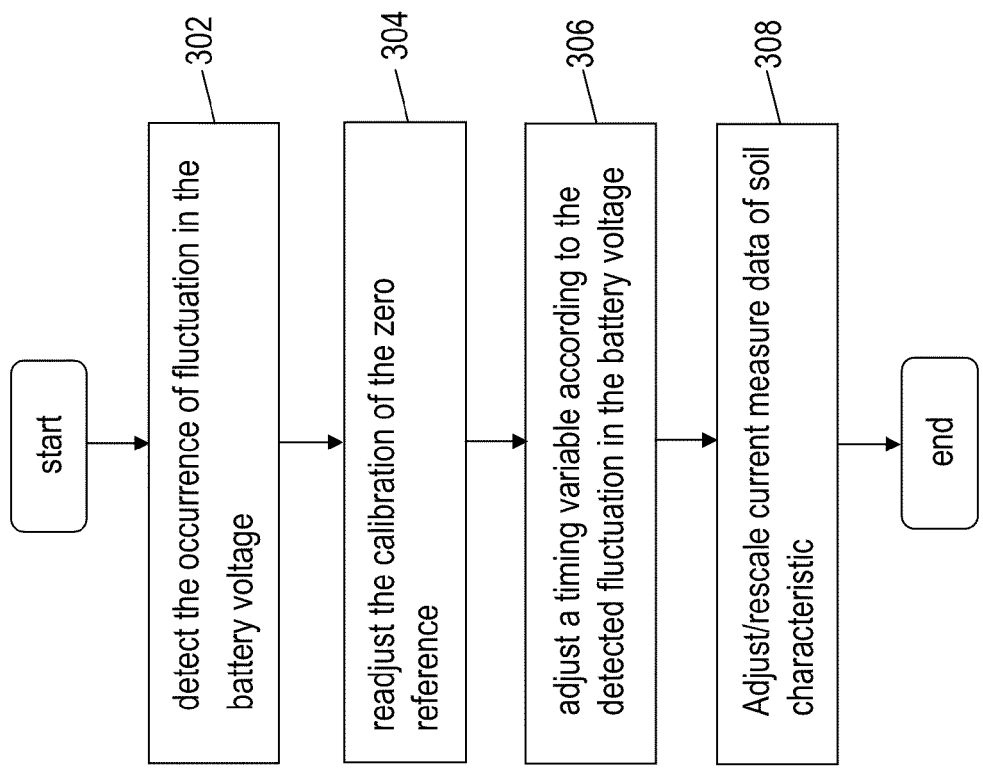
FIG. 3 is a flowchart illustrating method steps performed by the microcontroller to compensate imprecision induced by battery voltage fluctuation.

In conjunction with FIG. 1, FIG. 3 is a flowchart illustrating method steps performed by the microcontroller 110 to compensate imprecision induced by battery voltage fluctuation. In step 302, the microcontroller 110 can detect and measure the occurrence of a fluctuation in the battery voltage from the battery power circuit 102. In one embodiment, step 302 can be performed at each measure reading to ensure that the displayed information is accurate. The battery voltage can be checked via the ADC 112.

When a fluctuation in the battery voltage is detected, the microcontroller 110 in step 304 can readjust the calibration of the zero reference. For example, suppose that the zero reference of a pH or moisture measurement was previously assigned to a nominal value A, a fluctuation in the battery voltage may result in lower analog readings from the sensor circuit 104. Accordingly, the initial calibration to the nominal value A is no longer accurate. For correcting this inaccuracy, the microcontroller 110 can repeat steps 202 through 206 previously described to recalibrate the zero reference to a corrected nominal value different from the initial nominal value A.

In step 306, a timing variable defined in the firmware 120 can also be adjusted according to the detected fluctuation in the battery voltage. This timing variable can be set in accordance with the internal clock signal for driving diverse processing steps of the microcontroller 110. The adjustment of the timing variable can compensate for a slower clock signal, such that fluctuation in the battery voltage will not have any adverse effect on the operation of the microcontroller 110.

In step 308, based on the detected fluctuation of the battery voltage, the microcontroller 110 can also perform computation to adjust/rescale the current digital data, thereby correcting errors that may have been introduced in the analog readings. For example, suppose that the battery voltage in a regular operating condition (for example when the batteries are new) is 4 volts, and a value read from the ADC 112 represents ¼ of the full scale, i.e., corresponding to 1 volt at the sensor output. Much later, suppose that the detected battery voltage is 2 volts and the same reading corresponding to 1 volt at the sensor output is made, the measure data should be read as ½ of the full scale based on the same calculation method. However, by detecting the fluctuation of the battery voltage from 4 volts to 2 volts, the microcontroller 110 can compute an adequate factor to re-scale the current data, so that consistent and accurate measure information can be displayed.

It is worth noting that while steps 306 and 308 are shown after step 304, all of steps 304 through 306 can be performed in any order, successively or in parallel. Moreover, in alternate embodiments, recalibration of the zero reference as described in step 304 may be conducted on a periodic basis (e.g., at preset intervals of time) rather than upon detection of a fluctuation in the battery voltage.

Figure 4:
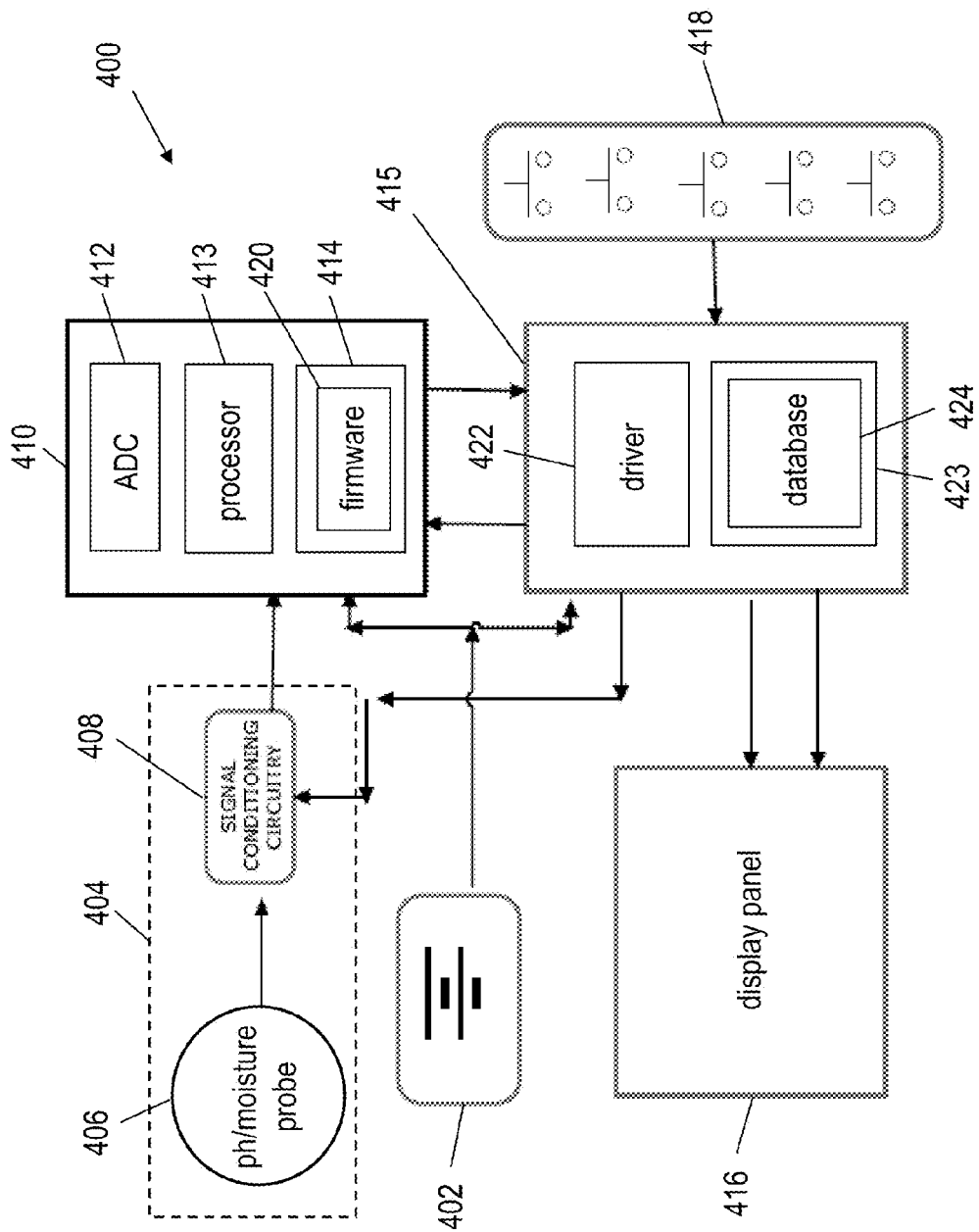
FIG. 4 is a block diagram illustrating another electronic gardening tool with enhanced smart features for assisting a user to provide care to a plant.

FIG. 4 is a block diagram illustrating another electronic gardening tool 400 with enhanced smart features for assisting a user to provide care to a plant. The electronic gardening tool 400 can include a battery power circuit 402, a sensor circuit 404 having a sensor device 406 and a signal conditioning circuit 408, a microcontroller 410 incorporating an analog-to-digital converter (ADC) 412, a processor 413 and a memory 414, a processing unit 415, a display panel 416, and one or more push button switch 418.

The battery power circuit 402 can be coupled with the microcontroller 410 and the processing unit 415 to provide electric power necessary for operation of the tool 400. The sensor device 406, which may be a pH or moisture sensor, can output an analog reading reflecting the soil characteristic of interest. The memory 414 of the microcontroller 410 may store a firmware 420 configured to drive the microcontroller 410 to perform floating calibration and adjustment/correction like previously described. The display panel 416 may be larger than the previously described embodiment, allowing display of graphics, histograms, alphanumeric texts, etc.

Some of the processing tasks assigned to the microcontroller in the previous embodiment may be transferred to the processing unit 415. Accordingly, the processing unit 415 may incorporate a driver 422 responsible of conducting various tasks such as processing signals outputted from the push button switch 418, generating control signals for the display panel 416, and power controls. Aside these capabilities, alternate embodiments may also have some portion of the calibration and/or adjustment/correction performed by the processing unit 415 to reduce the load of the microcontroller 410.

In addition, the processing unit 415 can receive the measurement data computed by the microcontroller 410, and apply further treatment/analysis thereon. In one embodiment, the processing unit 415 can have a memory 423 that contains an internal data base 424 listing plants and their preferred values for moisture and pH. By using a simple up/down and select button input, the user can search through the alphabetical list of plants to obtain the target values. In addition, additional care information can also be stored in the data base 424, for special instructions related to that plant. These special instructions may be accessed by pressing the button switch 418 when the plant is selected. The plant names are also grouped together by type (i.e., tree, house plant, vegetable, etc.) to allow faster access to the information. A user can either choose to use the data base information, or select a basic mode where only the probe value is displayed.

In some embodiments, the list of plants can be in an alphabetical order. A user may first select the beginning letter of the plant from a scrolling column of the alphabet, then all the plants that begin with that letter can be scrolled through for final selection. When a plant has been selected, the preferred value is shown as well as a bar graph and digital read out of the current reading. The bar moves as a graphical representation of the current measure readings. A programmed feature for the unit would display further instructions by comparing the current soil value to the target value appropriate for the particular plant, and suggesting an action to the user. For example, if the moisture target is 8.0 and the current reading of the tool 400 is 3.0, the display panel 416 can show a message indicating that the soil is too dry, and immediate light watering should occur followed by later additional watering.

In one variant embodiment, the tool 400 can also have a "favorite" selection feature. Each time a plant is selected by a user and then used for a reading, the use can be recorded by the processing unit 415. When the "favorites" feature is selected by the user, the most used plants (e.g., up to 20) can appear on the display panel 416 for faster selection by the user. The top of the list is the most selected plant and so forth down the list, so the most used plant is the easiest and fastest one to select without have to scan through the entire list of plants. The list of most selected plants can be constantly updated after every use. If a user were to stop using a given favorite plant, for example because the plant was no longer available, its name can start moving down the priority list of favorites, while new plants with increasing number of selections move up the priority list. Moreover, the user can manually add and subtract plants to the favorites list using the menus and selection keys.

The above-described electronic gardening tool 400 hence incorporates smart features that can assist the user in providing suitable care for any plants of interest. Aside these enhanced features, the tool 400 also has the same advantages described previously in connection with the tool 100. In particular, the use of a floating calibration method can save the extra cost of assembling a calibration circuit, so that no calibration is required at the factory.

Figure 5:
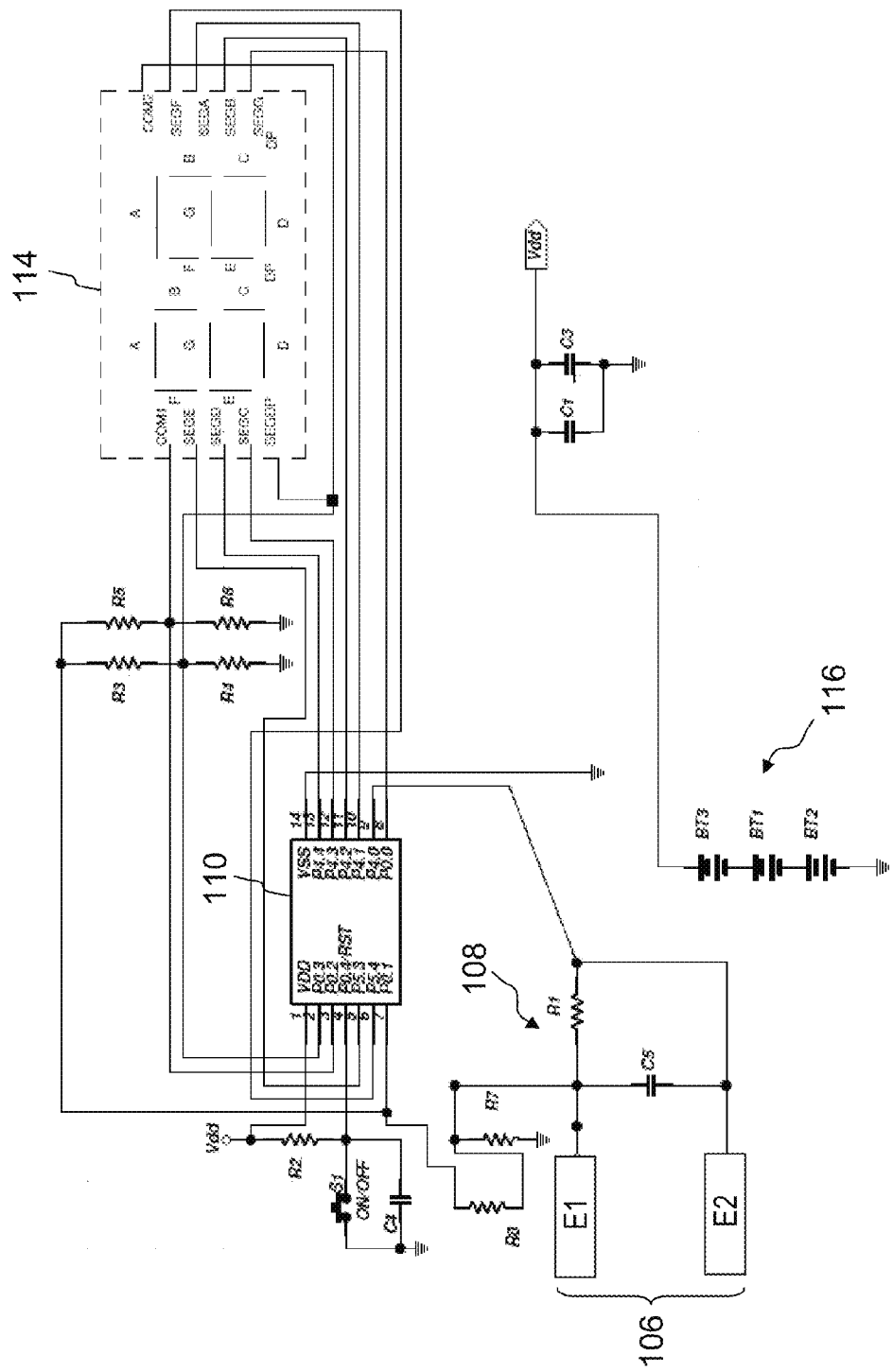
FIG. 5 is a circuit diagram illustrating one circuit board embodiment of the electronic gardening tool shown in FIG. 1.

FIG. 5 is a circuit diagram illustrating one circuit board embodiment of the electronic gardening tool 100 with no calibration circuit. As shown, the sensor device 106 may include two electrodes E1 and E2. The signal conditioning circuit 108 interposed between the microcontroller 110 and the electrodes E1, E2 of the sensor device 106 can have a simple construction comprising multiple resistors (such as R1, R7, R8) and a capacitor (such as C5). The microcontroller 110 can be coupled with the reference voltage Vdd, and include a plurality of input and/or output ports (such as P0.0, P0.1, P0.2, etc.) The display panel 116 can be a two-digit display that includes a plurality of input ports (such as COM1/COM2, SEGA, SEGB, SEGC, etc.) for driving the different display segments (such as segments A, B, C, etc.). Other components and circuit connection on the circuit board can include a voltage divider circuit including resistors R3, R4, R5 and R6, and a switch S1 connected with a resistor R1 and capacitor C4 between the ground and Vdd voltages. No calibration circuit for the sensor device 106 is required.

Figure 6:
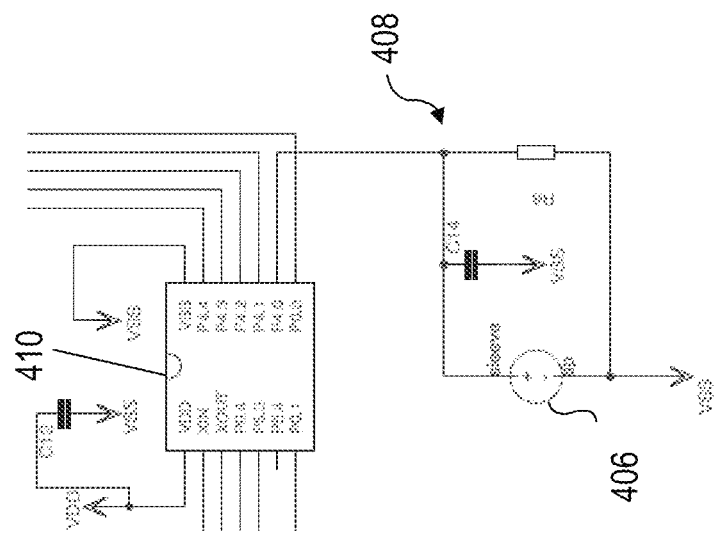
FIG. 6 is a circuit diagram illustrating a circuit portion of the electronic gardening tool shown in FIG. 4 with the sensor device being exemplary a moisture sensor.

FIG. 6 is a circuit diagram illustrating a circuit portion of the electronic gardening tool 400 including the sensor device 406, the signal conditioning circuit 408 and the microcontroller 410, wherein the sensor device 406 is exemplary a moisture sensor. Likewise, other circuit portions and connections (such as connections from the microcontroller 410 to the processing unit 415) are omitted for clarity. As shown, the signal conditioning circuit 408 interposed between the sensor device 406 and the microcontroller 410 can include a resistor R6 and a capacitor C14 connected parallel between the two electrodes of the sensor device 406. Again, no calibration circuit for the sensor device 406 is required as the shown embodiment implement a floating calibration method.

Figure 7:
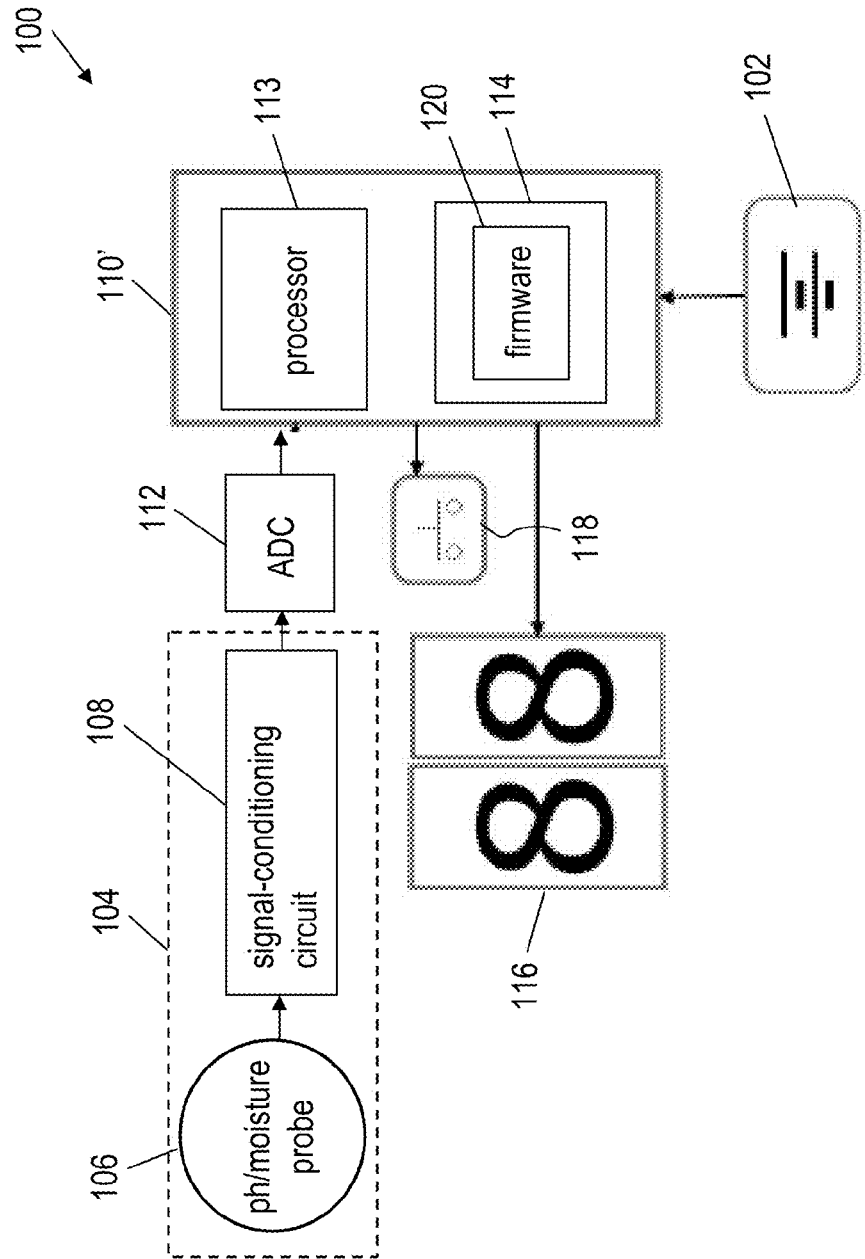
FIG. 7 is a block diagram illustrating a variant hardware embodiment of the electronic gardening tool shown in FIG. 1.

It is worth noting that the above features and advantages may be reached with various types of hardware architectures. For example, while FIG. 1 illustrates an embodiment in which the ADC 112, processor 113 and memory 114 may be conveniently integrated into a single-chip microcontroller 110, an alternate embodiment as shown in FIG. 7 can also have the ADC 112 provided as a distinct IC chip separate from the IC chip of the microcontroller 110'. Likewise, the embodiment of FIG. 4 only illustrates an example of hardware architecture including two IC chips (i.e., the ADC 412, processor 413 and memory 414 are integrated into a first chip formed by the microcontroller 410, and the driver 422 and memory 423 are integrated in another chip formed by the processing unit 415). However, the capabilities of the ADC 412, processor 413, driver 422 and memory 423 can be distributed through different hardware configurations, for example through a highly integrated single IC chip, or through a low-integration architecture comprising four IC chips.

Figure 8:
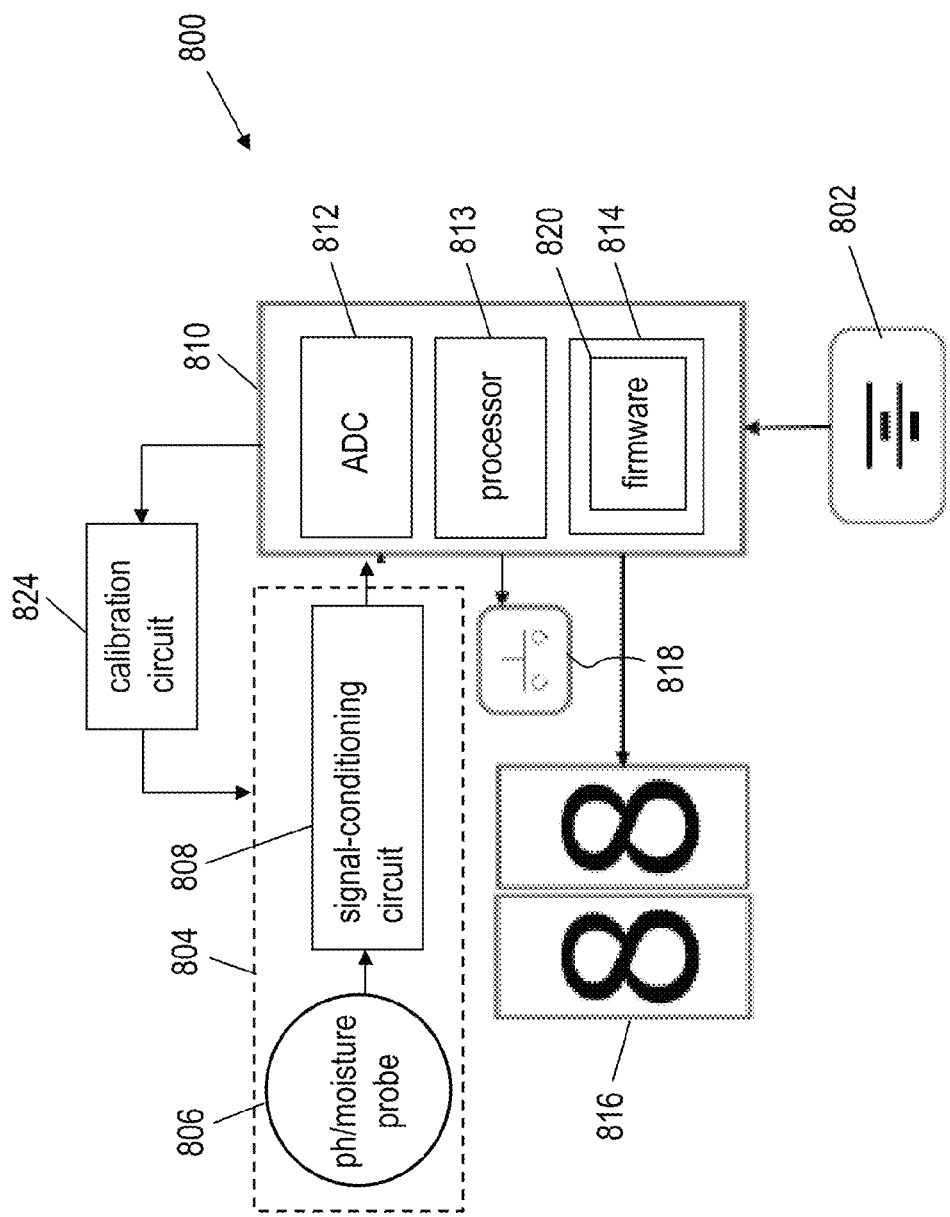
FIG. 8 is a block diagram illustrating one embodiment of the electronic gardening tool implementing a fixed calibration method.

While the aforementioned electronic gardening tools have been described as implementing a floating calibration method, alternate embodiments may also apply a fixed calibration method in case the additional cost of an extra calibration circuit is permitted. FIG. 8 is a block diagram illustrating an exemplary embodiment of an electronic gardening tool 800 implementing a fixed calibration method. Like the basic embodiment shown in FIG. 1, the electronic gardening tool 800 can include a battery power circuit 802, a sensor circuit 804 having a sensor device 806 and a signal conditioning circuit 808, a microcontroller 810 incorporating an analog-to-digital converter (ADC) 812, a processor 813 and a memory 814 loaded with a firmware 820, a display panel 816 coupled with the microcontroller 810, and one or more button switch 818. One main difference with the previous embodiments lies in the additional calibration circuit 824 that is connected between the sensor circuit 804 and the microcontroller 810.

Figure 10:
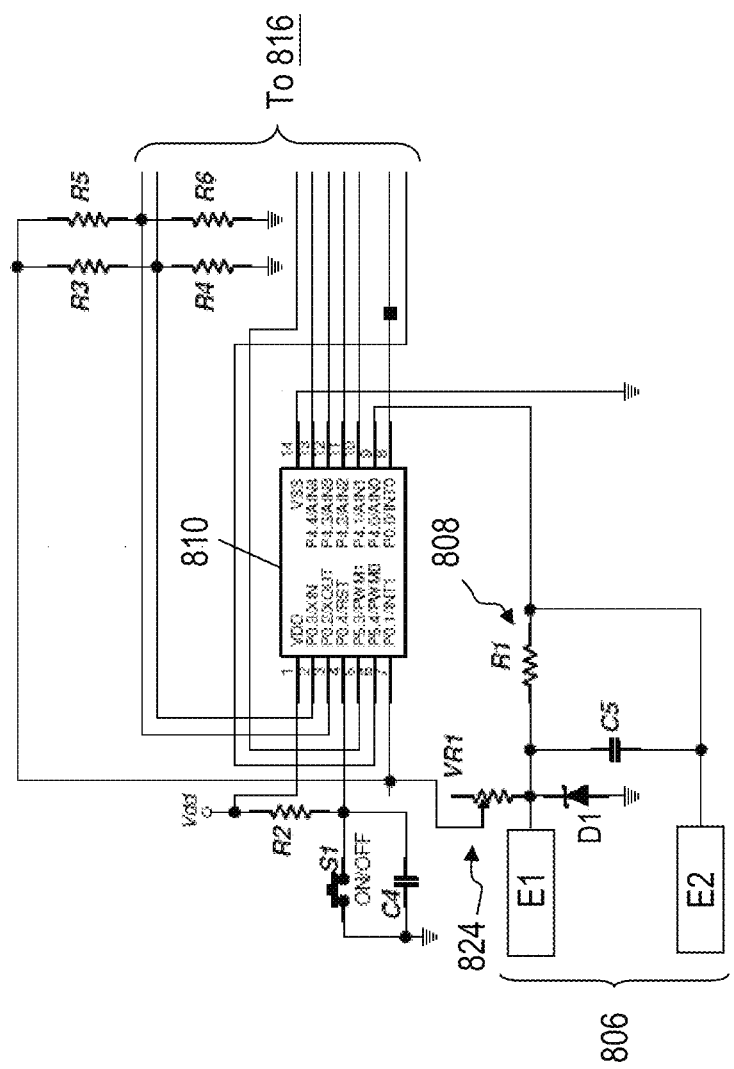
FIG. 10 is a circuit diagram illustrating one embodiment of the calibration circuit shown in FIG. 8 exemplary associated with the pH sensor device.

FIG. 10 is a circuit diagram illustrating one embodiment of the calibration circuit 824 associated with the sensor device 806, which exemplary is a pH sensor. As shown, the calibration circuit 824 can include a variable resistor VR1 that can be connected between the electrode E1 of the sensor device 806 and an associated port of the microcontroller 810. A Zener diode D1 can be coupled between the electrode E1 and the ground to set a virtual ground of about 2.2 volts above the battery ground for the ADC 812. The variable resistor VR1 may be adjusted at the factory to associate the zero reference of the measured soil characteristic (i.e., pH) with a fixed sensor output voltage close to the virtual ground. In this manner, the soil characteristic can be measured as an absolute reading relative to the fixed reference voltage.

Figure 9:
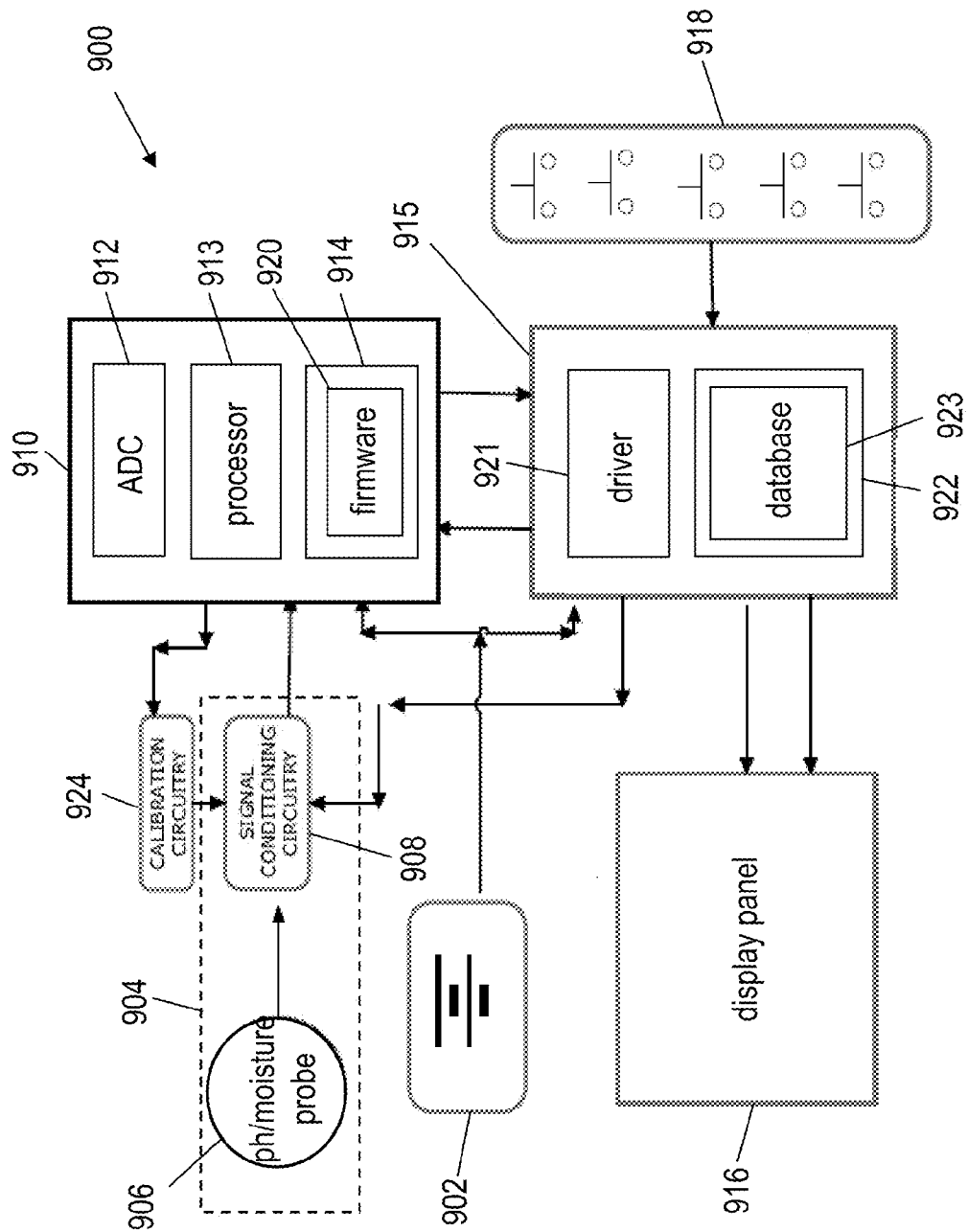
FIG. 9 is a block diagram illustrating another embodiment of the electronic gardening tool implementing the fixed calibration method.

FIG. 9 is a block diagram illustrating another electronic gardening tool 900 that can implement the fixed calibration method. The electronic gardening tool 900 is a variation of the embodiment shown in FIG. 4, including a battery power circuit 902, a sensor circuit 904 having a sensor device 906 and a signal conditioning circuit 908, a microcontroller 910 including an analog-to-digital converter (ADC) 912, a processor 913 and a memory 914 loaded with a firmware 920, a processing unit 915, a display panel 916 coupled with the processing unit 915, and one or more switch button 918. Like the embodiment of FIG. 4, the processing unit 915 can include a driver 921, and a memory 922 that contains a data base 923 listing plants and related care information. A calibration circuit 924 can be connected between the sensor circuit 904 and the microcontroller 910 for setting a fixed zero reference at the factory.

Figure 11:
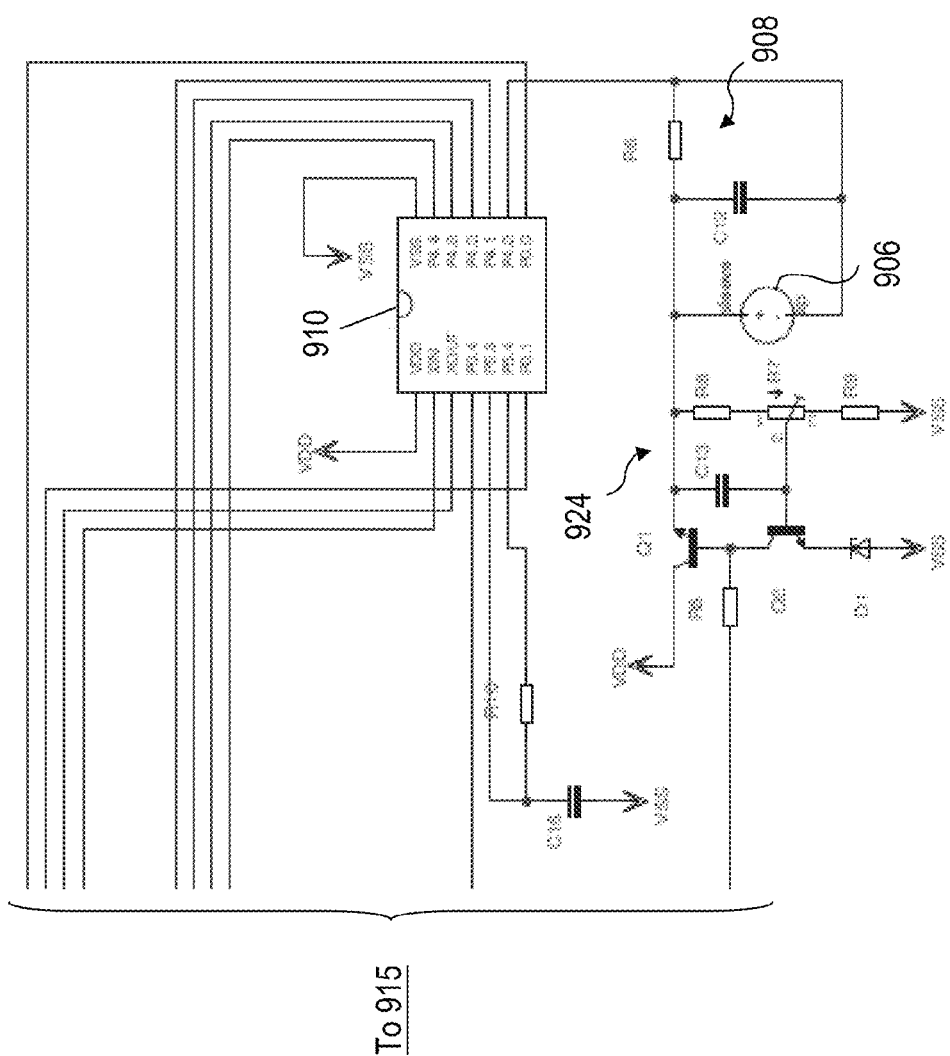
FIG. 11 is a circuit diagram illustrating one embodiment of the calibration circuit shown in FIG. 9 exemplary associated with a pH sensor device.

FIG. 11 is a circuit diagram illustrating one embodiment of the calibration circuit 924 associated with the sensor device 906, which exemplary is a pH sensor. For clarity, only certain connections between the calibration circuit 924, the sensor device 906, and the microcontroller 910 are shown. The calibration circuit 924 can include a variable resistor R7 that has two terminal ends respectively coupled with resistors R8 and R9. The chain of resistors R7, R8 and R9 can be connected between a reference voltage Vss and one electrode of the sensor device 906. Other components can include transistors Q1 and Q2, capacitor C13, Zener diode D1, resistor R5, capacitor C16 and resistor R10 that may be electrically connected as shown in FIG. 11. It can be noted that the illustrated circuit connection can be easily turned to a moisture sensor configuration by having R10=0 and removing C16. In the same manner, the variable resistor R7 may be adjusted at the factory to associate the zero reference of the measured soil characteristic (i.e., pH) with a fixed sensor output voltage.

While the fixed calibration method may require the extra cost of a calibration method, less computation may be needed at the microcontroller, which may reduce power consumption. Aside the fixed calibration features, it will be appreciated that the embodiments described in connection with FIGS. 8-11 may also include certain of the features previously described in connection with the embodiments implementing floating calibration, such as automatic selection of the proper program code to run for computing pH or moisture measure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. In addition, while the invention has been described with reference to some specific soil characteristics, such as moisture and pH, the same or very similar measuring techniques and circuitry may be used to measure and display other soil characteristics such as fertility (e.g., based on the amount of salt content dissolved in the soil) and the amount of light to which the soil at a particular location is exposed. These and other variations, modifications, additions, and improvements may fall within the scope of the invention as defined in the claims that follow.

What is claimed is:

1. An apparatus for measuring a soil characteristic, comprising:
    a sensor circuit adapted to output an analog signal reflecting a measure of the soil characteristic;
    an analog-to-digital converter adapted to convert the analog signal to a digital value;
    a microcontroller receiving and processing the digital value; and
    a display panel for displaying the measure of the soil characteristic;
    wherein the microcontroller is configured to:
        obtain a plurality of initial readings from the sensor circuit when the apparatus is powered on;
        obtain a nominal value by averaging the initial analog readings; and
        assign a zero reference associated with a neutral value of the soil characteristic to the nominal value derived by averaging the initial readings.

2. The apparatus according to claim 1, wherein the analog-to-digital converter and the microcontroller are integrated into a same integrated circuit chip.

3. The apparatus according to claim 1, wherein the sensor circuit comprises:
    a probe sensor; and
    a signal conditioning circuit adapted to convert an output of the probe sensor to the analog signal processed by the microcontroller.

4. The apparatus according to claim 3, wherein the probe sensor includes a pH sensor adapted to measure a pH value of the soil.

5. The apparatus according to claim 3, wherein the probe sensor includes a moisture sensor adapted to measure a moisture value of the soil.

6. The apparatus according to claim 1, wherein the microcontroller is further adapted to detect a fluctuation in a battery voltage.

7. The apparatus according to claim 6, wherein the microcontroller is further adapted to readjust the zero reference according to the detected fluctuation in the battery voltage.

8. The apparatus according to claim 6, wherein the microcontroller is further adapted to:
    process readings from the sensor circuit based on a timing variable defined in an embedded firmware, wherein the timing variable is set according to an internal clock signal of the microcontroller; and
    adjust the timing variable according to the detected fluctuation in the battery voltage.

9. The apparatus according to claim 6, wherein the microcontroller is further adapted to rescale current digital data of the measured soil characteristic in accordance with the detected fluctuation in the battery voltage.

10. The apparatus according to claim 1, wherein the microcontroller includes a firmware that includes a first program code for pH measure computation and a second program code for moisture measure computation.

11. The apparatus according to claim 10, wherein the microcontroller is adapted to determine which of the first and second program code is to be run based on data outputted from the analog-to-digital converter.

12. The apparatus according to claim 11, wherein a first range of the data outputted from the analog-to-digital converter corresponds to a configuration of the sensor circuit incorporating a moisture sensor, and a second range of the data outputted from the analog-to-digital converter corresponds to a configuration of the sensor circuit incorporating a pH sensor.

13. The apparatus according to claim 12, wherein the first range is located around a first output voltage of the sensor device equal to 0, and the second range is located around a second output voltage of the sensor device above zero volt.

14. The apparatus according to claim 1, further comprising a processing unit coupled with the microcontroller, wherein the processing unit is adapted to keep a database including plant type information, care and target values, usage monitoring for recording favorites, and input scanning information.

15. The apparatus according to claim 1, wherein the microcontroller is further adapted to temporarily hold the display of last measure data of the soil characteristic.

16. An apparatus for measuring a soil characteristic, comprising:
    a sensor circuit adapted to output an analog signal reflecting a measure of the soil characteristic;

a microcontroller coupled with the sensor circuit, wherein the microcontroller includes an analog-to-digital converter adapted to convert the analog signal to a digital value;

a display panel for displaying the measure of the soil characteristic; and a calibration circuit adapted to set a zero reference associated with a neutral value of the soil characteristic to a fixed reference voltage from the sensor circuit by averaging initial analog readings to obtain the neutral value.

17. The apparatus according to claim 16, wherein the calibration circuit includes a variable resistor, and the calibration circuit is connected between the sensor circuit and the microcontroller.

18. The apparatus according to claim 16, wherein the sensor circuit includes a pH sensor, a moisture sensor or both a pH sensor and a moisture sensor.

19. The apparatus according to claim 16, wherein the microcontroller is programmed to hold a digital value corresponding to a measured soil characteristic on the display for a predetermined period of time, after the soil characteristic has been measured.

20. The apparatus according to claim 16, wherein the microcontroller is programmed to recognize sudden lowering in a value of a measured soil characteristic and continue to display the measured value obtained before the sudden change occurred.

21. The apparatus according to claim 16, wherein the microcontroller is programmed to recognize a sudden increase in a value of a measured soil characteristic to a new measured value, and display the new measured value instead of a prior displayed value.

* * * * *